United States Patent
Yoo et al.

(10) Patent No.: US 7,262,918 B1
(45) Date of Patent: Aug. 28, 2007

(54) LIGHT BEAM CONDITIONER

(75) Inventors: Woo Sik Yoo, Palo Alto, CA (US); Kitaek Kang, Dublin, CA (US)

(73) Assignee: WaferMasters Incorporated, San Jose, CA (US)

( * ) Notice: Subject to any disclaimer, the term of this patent is extended or adjusted under 35 U.S.C. 154(b) by 0 days.

(21) Appl. No.: 11/516,129

(22) Filed: Sep. 6, 2006

(51) Int. Cl.
*G02B 27/14* (2006.01)
*G02B 27/10* (2006.01)

(52) U.S. Cl. ........................ 359/629; 359/618

(58) Field of Classification Search ............... 359/618, 359/619, 629; 372/9, 93, 99, 107, 92; 398/187
See application file for complete search history.

(56) References Cited

U.S. PATENT DOCUMENTS 4,791,630 A * 12/1988 Priatko ........................ 398/187
5,825,551 A * 10/1998 Clarkson et al. ............ 359/629
5,861,991 A * 1/1999 Fork ........................... 359/618

* cited by examiner

*Primary Examiner*—Quyen P Leung
(74) *Attorney, Agent, or Firm*—MacPherson Kwok Chen & Heid LLP; Tom Chen

(57) ABSTRACT

A system and method for conditioning a beam of light comprised of several wavelengths by means of selecting from among the plurality of available wavelengths, a desired set of wavelengths simultaneously. A small number of multi-wavelength lasers or continuous spectra light sources, or both, may be the source for the plurality of light wavelengths, and a configuration of beam splitters/combiners, mirrors and wavelength selectable pass- and stop-filters provide a combined beam of light wavelengths selected from among the available wavelengths.

24 Claims, 5 Drawing Sheets

LIGHT BEAM CONDITIONER

BACKGROUND OF THE INVENTION

1. Field of the Invention

This invention generally relates to light beams and in particular to multi-wavelength lasers and continuous spectra light sources.

2. Related Art

A number of optical techniques may be used to obtain information about materials. One such technique is Raman spectroscopy. In Raman spectroscopy, laser light is incident on a surface of a material to be analyzed. Most of the light scatters elastically from the surface (which is referred to as Rayleigh scattering). However, some of the light interacts with the material at and near the surface and is scattered inelastically due to excitation of vibrational, rotational, and/or other low-frequency modes of the material. Detecting the frequencies of such vibrational states yields information about the molecular structure and quality of the material. The inelastically scattered light is shifted in wavelength with respect to the incident laser light, either down in frequency (corresponding to the excitation of a material mode by the incident photons, also referred to as Raman Stokes) or up in frequency (corresponding to the interaction of the incident photons with an already-excited material mode, also referred to as an anti-Stokes Raman). The amount of the shift is independent of the excitation wavelength, and the Stokes and anti-Stokes lines are displaced from the excitation signal by amounts of equal magnitude.

Many laser and other optical sources that are used to analyze materials using spectroscopy are known to generate a plurality of spectral lines. This can be used advantageously. For example, many semiconductor electronic devices consist of numerous layers of semiconductor materials with varying compositions and constituents. Often, these layers are Raman active, and the magnitude of the wavelength shift of the Stokes and anti-Stokes lines relative to the excitation wavelength are dependent on the stoichiometry of the chemical composition and crystalline properties of each layer.

As is well known in optics, because the index of refraction of semiconductor materials is dispersive, different probe wavelengths have different penetration depths into the bulk of the material. It is often the case that such penetration depths are comparable to the depths to which various layers of materials are prepared. Thus, use of laser light of different excitation wavelengths will probe the Raman scattering properties of materials at different depths. It is therefore advantageous to have a system capable of simultaneously providing laser excitation lines to obtain, via Raman spectroscopy, information about the quality and stoichiometry of layers at various depths of material, within the limits of penetration of the laser lines.

Other applications can also be envisioned. For example, in liquid samples containing biological specimens, choice of excitation wavelength affects the generation of fluorescence, which is another means for investigation of biological materials.

One problem that arises in this connection is the means for selecting the preferred set of wavelengths, deleting or excluding others, and combining them into a single beam for optical characterization of material properties. For example, an argon ion laser has more than thirteen laser lines, all of widely varying relative output.

FIG. 1 shows a simplified view of a conventional means for selecting and combining different wavelengths originating from several different sources, such as lasers, multi-wavelength lasers, or continuous spectra sources. These sources can be identical, and therefore produce the same laser lines, or they may be different, and thus provide a spectrum of wavelengths. In this approach, a bank of light sources provides multiple light beams 105, each at multiple wavelengths of laser output or continuous spectra, to a bank of bandpass filters 115, referred to collectively as a stack. Beams of single wavelengths pass through each filter 115, which limits the wavelength or wavelengths that transmit. The several beams then pass to a stack of beam splitters 110 or partial mirrors that behave in a manner reciprocal to beam splitting, i.e., they combine the beams into a single beam 125 that exits the system at the bottom of the figure. Mirrors 120 are strategically placed to recoup some fraction of the laser beams that would otherwise be lost. However, this is a highly inefficient system from the point of view of wasted beam energy, power consumption and duplication of costly laser hardware. Furthermore, optical alignment to combine beams from a plurality of separate lasers or other light sources requires costly precision alignment.

Therefore, there is a need for forming light beams by means of using least a multi-wavelength source in which the desired output wavelengths can be chosen with minimum loss of energy and ease of selection.

SUMMARY

According to one aspect of the present invention, a light beam conditioner system includes a dispersive means to separate the wavelengths of one or more lasers, some of which may be multi-wavelength or continuous spectra sources, where the dispersive means can be a group of beam splitters and filters acting in combination, a diffraction grating, a phase hologram, or the like. The dispersive elements act in transmission, reflection, or a combination. Various wavelength filters, notch filters and beam blockers are employed to separate, provide, combine or block wavelengths, as desired. Mirrors are employed to redirect the beam. The separate beams are combined as a single collinear beam or directed to converge.

According to one embodiment of the present invention, a beam of collimated laser light originating from one or more lasers and/or from a source of continuous light spectra and prepared as a single co-linear beam containing a plurality of laser lines is incident on a beam splitter that is a part of a stack of beam splitters. The corresponding beam splitter breaks the incident beam into a number of beams equal to the number of beam splitters. The splitters are stacked in a serial manner, and preferably in serial physical contact, such that beam misalignments are minimized. The beams that are directed out of the stack each pass through a filter designed to pass only a narrow range of light centered about a selected wavelength, while blocking all others. Filters can be mechanically substituted to change the wavelength selected for transmission by using, for example, a filter wheel. Some beams so directed can also be blocked entirely so as to limit the number of wavelengths that are provided. A second stack of beam splitters in essentially mirrored configuration receives each of the individual beams, each of which now consists of a single wavelength, and the stack behaves in a reciprocal fashion, thus combining all the beams into a single beam which is directed from the beam conditioning system. A number of mirrors are placed strategically on back surfaces of certain beam splitters to improve the efficient provision of energy in each wavelength.

In yet another embodiment of the present invention, a beam of light comprised of several wavelengths, whether from a single laser or at least two lasers and/or from a source of continuous light spectra, is directed to a diffraction grating which spatially disperses the various wavelength constituents of the beam into different orders of diffraction, at different angles with respect to the normal to the grating surface and with respect to the zero order (reflected) beam, depending on wavelength. In this embodiment, blocking filters stop undesired wavelengths by being placed in the path of the particular diffracted order of that wavelength. Other wavelengths are not blocked and proceed through the optical system. The selected group of beams are incident on a concave (focusing) mirror, which directs the selected beams to converge at a focal point, beyond which the individual beams, each of a specific wavelength, each diverge, both in beam size and from each other.

In yet another embodiment of the present invention, a beam of light comprised of several wavelengths, whether from a single laser or at least two lasers and/or from a source of continuous light spectra, is directed to a diffraction grating which spatially disperses the various wavelength constituents of the beam into different orders of diffraction, at different angles with respect to the normal to the grating surface and with respect to the zero order (reflected) beam, depending on wavelength. In this embodiment, blocking filters stop undesired wavelengths by being placed in the path of the particular diffracted order of that wavelength. Other wavelengths are not physically blocked and proceed through the optical system. The selected group of beams are incident on a bank of planar mirrors, placed to intercept and reflect each beam of specific wavelength, each of which separately directs the selected beams to converge at a common point, beyond which the individual beams, each of a specific wavelength, remain collimated, but diverge from each other in space.

Alternatively, in yet another embodiment, the planar mirrors of the previous embodiment may direct each of the light beams, each of a specific selected wavelength, parallel to each other, to a bank of beam splitters that act as a beam combiner, producing a single collimated beam, as described earlier.

BRIEF DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

Systems and techniques provided herein may allow for more flexible spectroscopy than provided by existing spectroscopy systems.

Optical spectroscopy systems often have need for selecting multiple wavelengths, either individually or simultaneously, in any desired combination. In Raman spectroscopy, for example, the argon ion laser is a popular choice, and generates a number of useful wavelengths (e.g., 457.9 nm, 488.0 nm, 514.5 nm, etc.). In certain materials, especially biological specimens, fluorescence is aggravated by illumination by shorter wavelength light, so that longer wavelength lasers, i.e., toward the infrared, are preferred. Therefore, a convenient means for selecting wavelengths from one or more laser sources is beneficial.

In order to provide enhanced flexibility in spectroscopy, systems and techniques provided herein include optical beam splitting or dispersal, filtering and recombining designs. As a result, a multiple wavelength source of light can be quickly sorted into separate wavelengths, wavelengths down-selected, and recombined for multiple wavelength spectroscopic applications.

Figure 1:
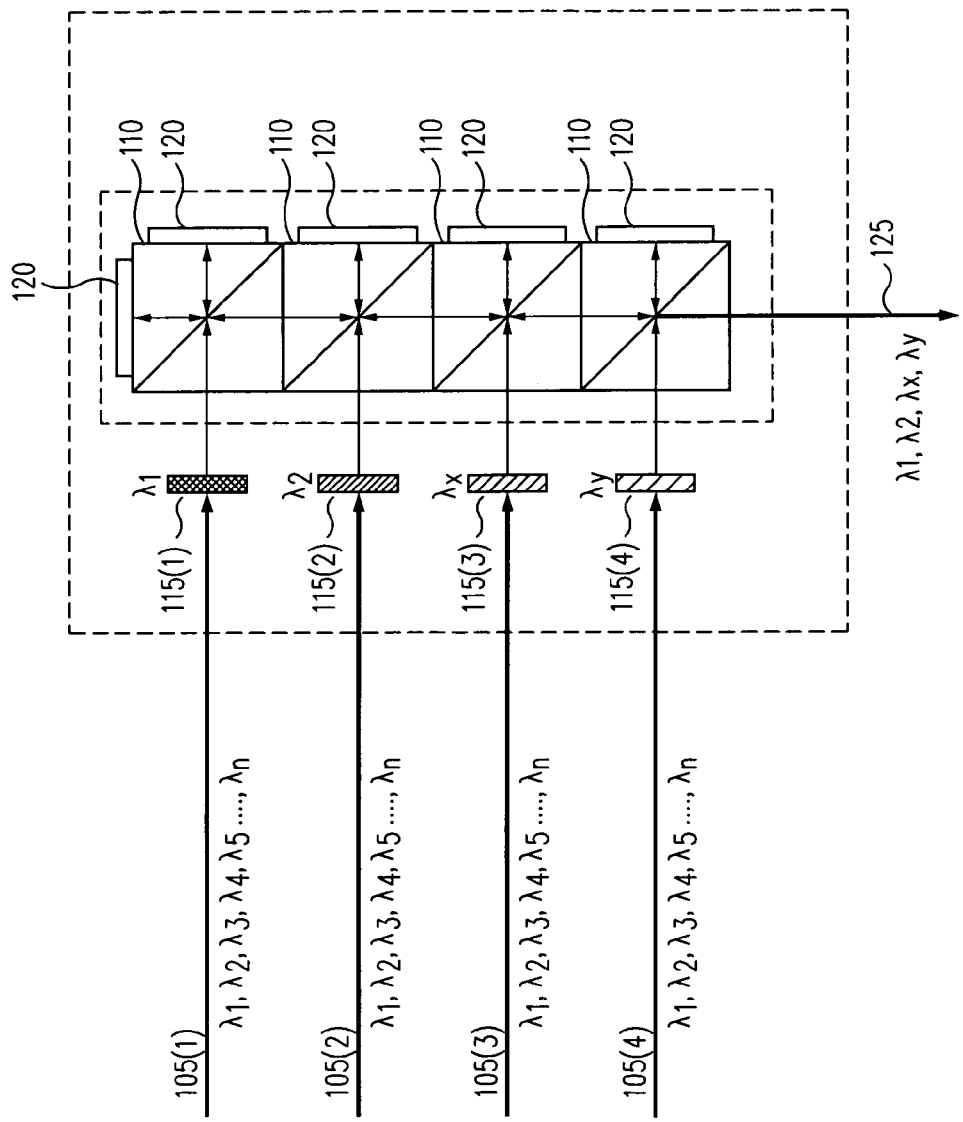
FIG. 1 is a simplified view of a conventional means for combining selected wavelengths from one or more laser and/or continuous spectra sources.
Figure 2:
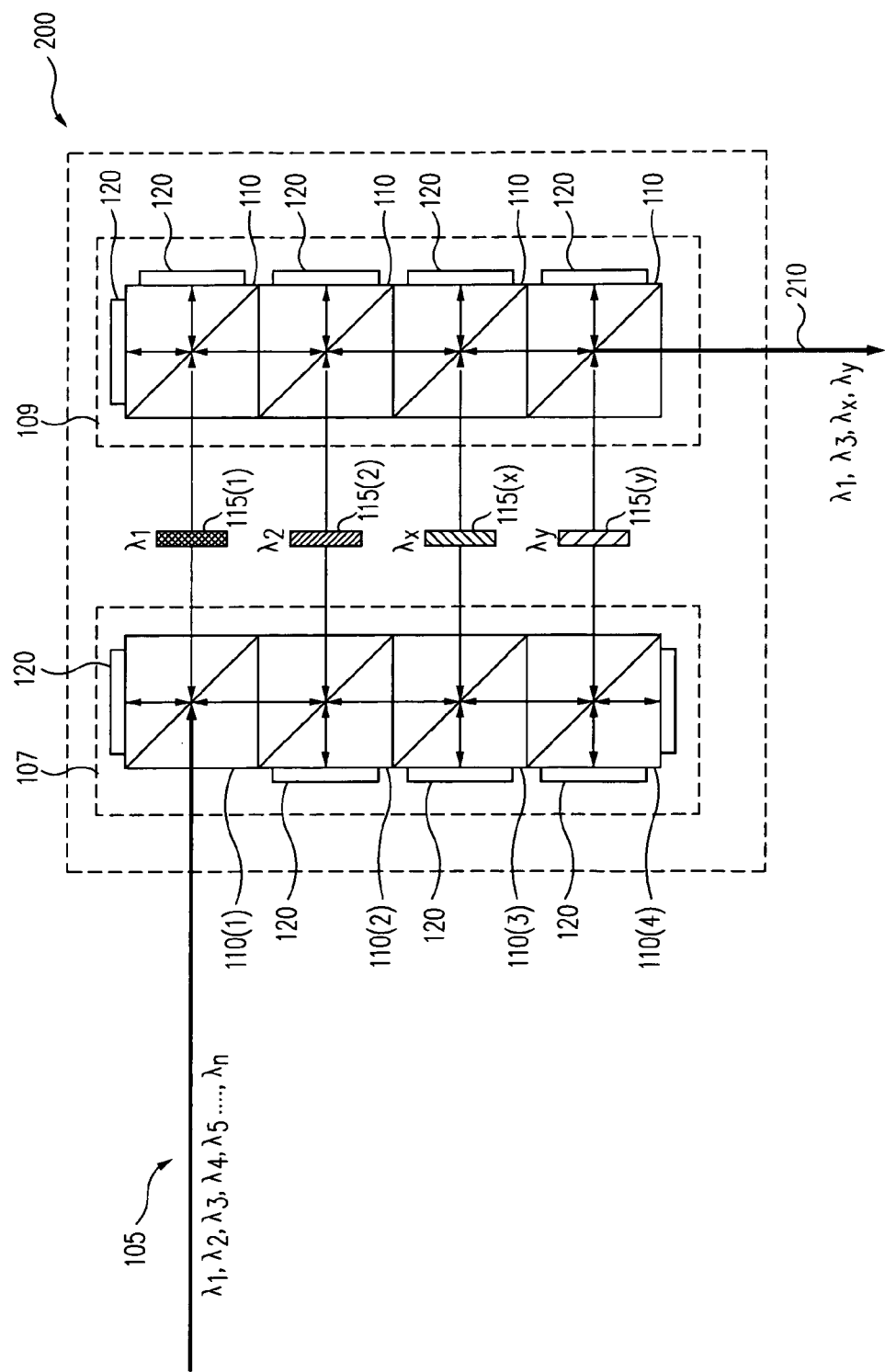
FIG. 2 is a simplified view of a light beam of multiple wavelengths from one or more lasers and/or continuous spectra sources being selected and recombined according to one embodiment of the present invention.

FIG. 2 shows one embodiment in which a beam of light 105 enters a beam conditioning system 200, in which light beam 105 comprises light of a number of wavelengths $\lambda_1$, $\lambda_2, \lambda_3, \lambda_4, \lambda_5, \ldots, \lambda_n$. The wavelengths may arise from laser lines from one or more lasers, plasma lines from the lasers, or spectra from a source other than a laser. Light beam 105 enters the first of a stack 107 or serial configuration of beam splitters 110 (shown stacked vertically), where the beam is split into two components in each beam splitter 110. Different types of beam splitters may be used, such as non-polarizing cube beam splitters, polarizing cube beam splitters, broadband dielectric surface coated polarizing beam splitters, single laser line non-polarizing front surface beam splitters, pellicle beam splitters, and neutral density beam splitters. One portion transmits through a first beam splitter 110(1) to a filter 115(1) which provides for transmission of light only at wavelength $\lambda_1$. The remaining portion of the light beam is reflected at substantially a right angle in the first of the beam splitters 110(1) and directed to a second beam splitter 110(2) in stack 107, where it is similarly split further into two more beams. One portion is reflected towards a second filter 115(2), which provides for transmission of light only at wavelength $\lambda_3$.

The portion of light beam that transmits through second beam splitter 110(2) is directed to a third beam splitter 110(3), where it is similarly split for direction to a third filter 115(x), and to another beam splitter 110(4) in stack 107, and so forth. This process can be repeated so long as there is sufficient energy in the remaining light beams for useful application. 100% reflecting mirrors 120 are placed at strategic locations facing the various beam splitters 110 so as to reflect light back into beam conditioning system 200. Various types of mirrors can be used, such as metal front surface mirrors, broadband dielectric front surface mirrors, and narrow line-width dielectric front surface mirrors. By virtue of the multiple reflections between mirrors 120 and reflections and transmission taking place at each beam splitter 110, it is possible to recover a portion of light energy that would otherwise be lost, thus improving overall optical efficiency. A careful consideration of the combination of the arrangement of beam splitters 110, filters 115, and mirrors 120 shows that only light of the selected wavelengths exit beam conditioner system 200 and any light beams reflected by mirrors 120 back through beam conditioner system 200 are either finally directed into the beam that exits beam conditioner system 200, residually lost, or selectively blocked by filters 115 that are of different wavelengths.

Light that transmits through each of the respective filters 115 is limited to the wavelength or wavelengths specified by that filter. In the embodiment shown, each filter 115 in FIG. 2, e.g., transmits only a single wavelength of the plurality of wavelengths that enter beam conditioner system 200, although multi-wavelength filters are known in the art and can be used with the present invention. Different filters may be used, such as single wavelength bandpass filters, multiple wavelength bandpass filters, single wavelength notch stop-band filters, multiple wavelength notch stop-band filters, and opaque beam blocking filters. The light transmitted through each filter 115 enters a second stack 109 of combining beam splitters 110, where the process of combining the several transmitted beams takes place. A combined beam 210, consisting of the selected wavelengths, exits beam conditioner system 200 for use in a desired application or system.

Figure 3:
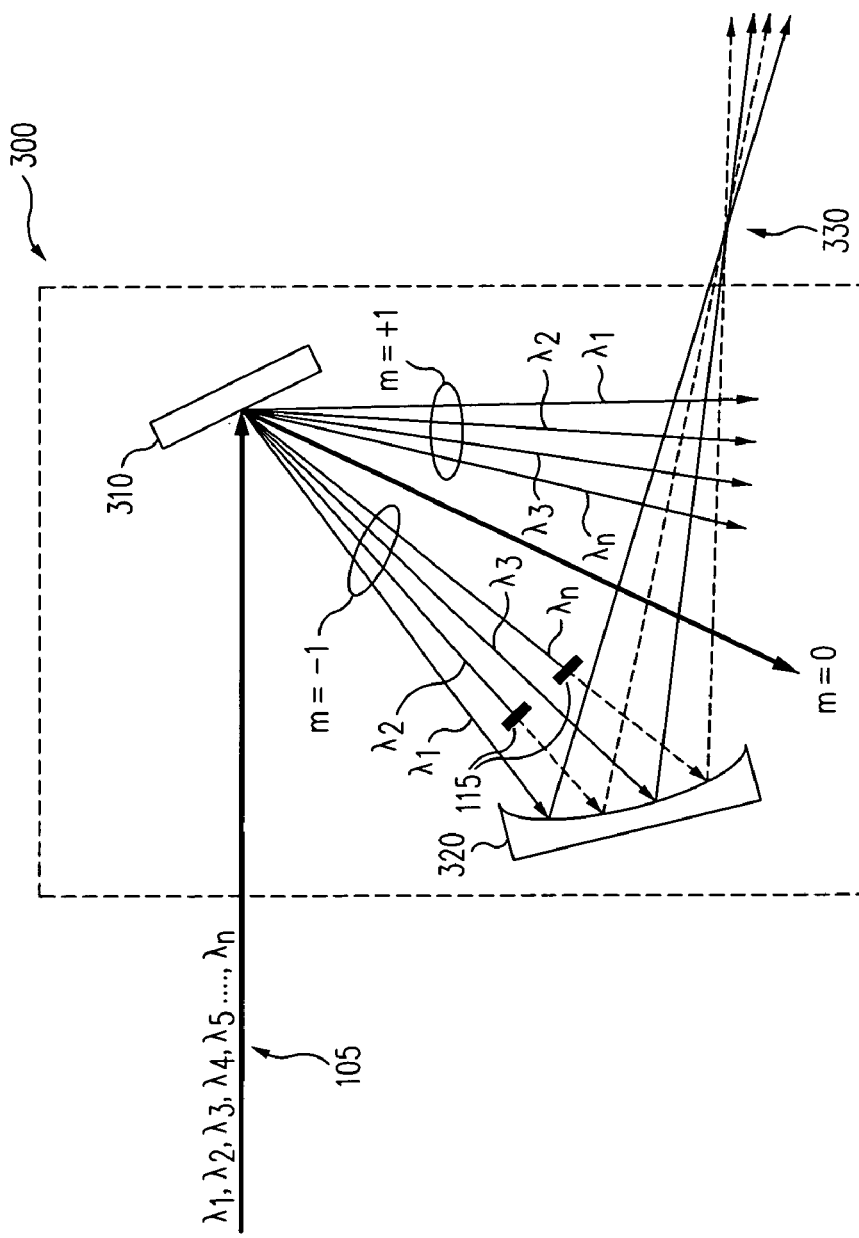
FIG. 3 is a simplified view of a light beam of multiple wavelengths from one or more lasers and/or continuous spectra sources being dispersed by a diffraction grating, selected via blocking filters or beam stops and being directed to a common convergence point via a focusing mirror.

FIG. 3 shows another embodiment of a beam conditioning system 300 in which light beam 105 comprised of a number of wavelengths $\lambda_1, \lambda_2, \lambda_3, \lambda_4, \lambda_5, \ldots, \lambda_n$ enters beam conditioner system 300. Light beam 105 is incident on a diffraction grating 310 so disposed as to disperse the beam of light into the various constituent wavelengths $\lambda_1, \ldots \lambda_n$ in different orders of diffraction and at different angles of diffraction from diffraction grating 310, according to the wavelength. One order of diffracted beams is typically selected for further filtering. Light contained in the zero order and all other diffraction orders are discarded, but the grating can be blazed, if desired, to improve the efficiency of the optical system. Filters 115 may consist of blocking filters as, for example, an opaque block, to prevent the beam of dispersed wavelength from proceeding further through the beam conditioner system 300. Thus, for example, in FIG. 3, the dispersed beams of wavelengths $\lambda_1, \ldots \lambda_n$ (not all shown) of diffraction order m=−1 are directed along paths in which filters 115 block light at wavelengths 2 and $\lambda_n$, but not light at the remaining wavelengths, i.e., $\lambda_1$ and $\lambda_3$. The transmitted light beams at the remaining wavelengths are incident on an off-axis focusing mirror 320 which directs the beams to a focal point 330, at which point all the beams are also convergent. Other forms of mirror 320 can be devised for other objectives, such as to focus and converge the beams at different points in space. Dispersed beams at the various wavelengths $\lambda_1, \ldots \lambda_n$ of diffraction order m=0 and m=1 are reflected away from focusing mirror 320 and are not used.

Figure 4:
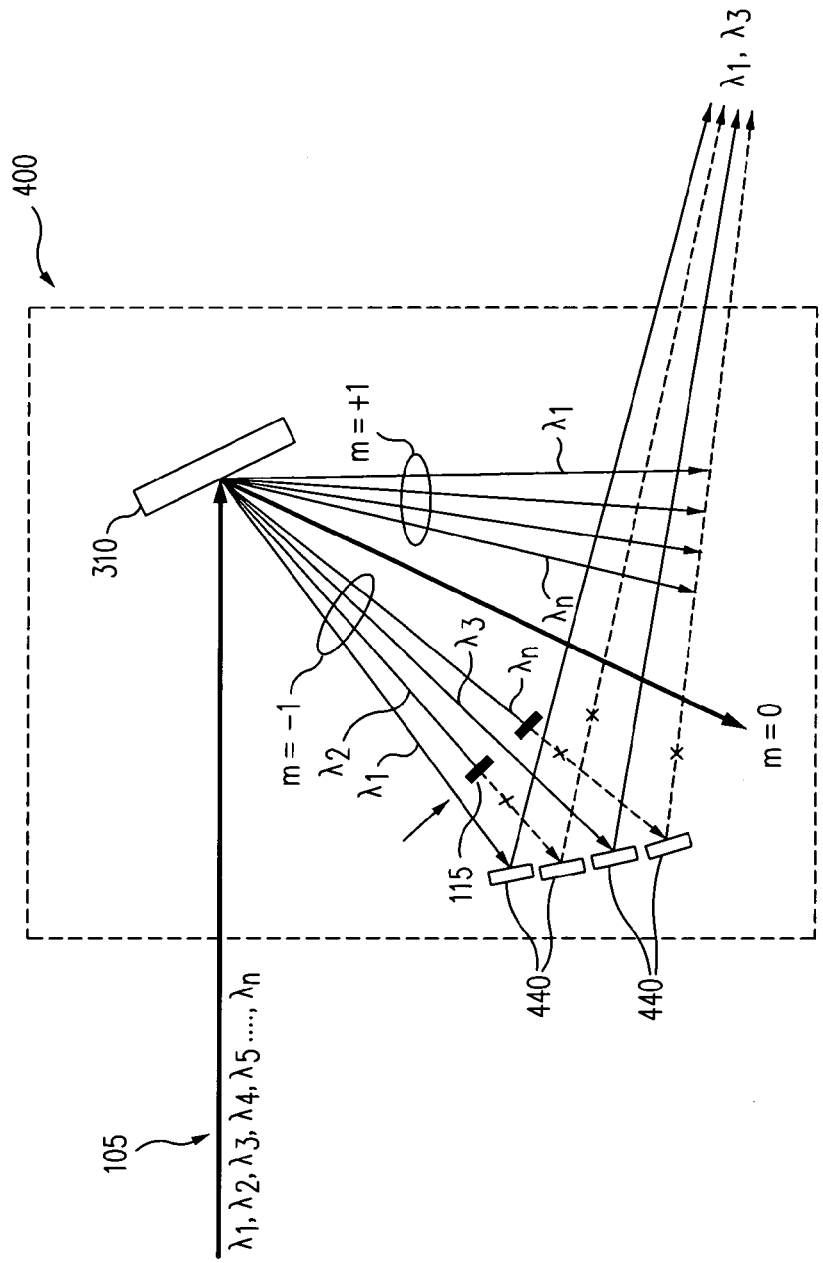
FIG. 4 is a simplified view of a light beam of multiple wavelengths from one or more lasers and/or continuous spectra sources being dispersed by a diffraction grating, selected via blocking filters or beam stops and being directed to a common convergence point via a bank of planar mirrors.

FIG. 4 shows another embodiment of a beam conditioning system 400 in which light beam 105 comprised of a number of wavelengths $\lambda_1, \lambda_2, \lambda_3, \lambda_4, \lambda_5, \ldots, \lambda_n$ enters beam conditioner system 400. As in the previous embodiment, namely beam conditioner 300, light beam 105 is incident on diffraction grating 310, dispersed according to spectral wavelength and order, and the selected diffraction order of wavelengths filtered or blocked according to the property of each filter 115. The transmitted light beams at the remaining wavelengths are incident on an array of mirrors 440 that direct each of the transmitted beams of light, each of a different selected wavelength, to the exit of beam conditioner system 400. The arrangement of mirrors 440 is such that the beams converge to a single spot at a location external to beam conditioner system 400; however, the beams are not focused, but only converge and overlap at the convergence point. Focusing will occur if the individual mirrors 440 are concave with a focal length specified for that mirror 440.

Figure 5:
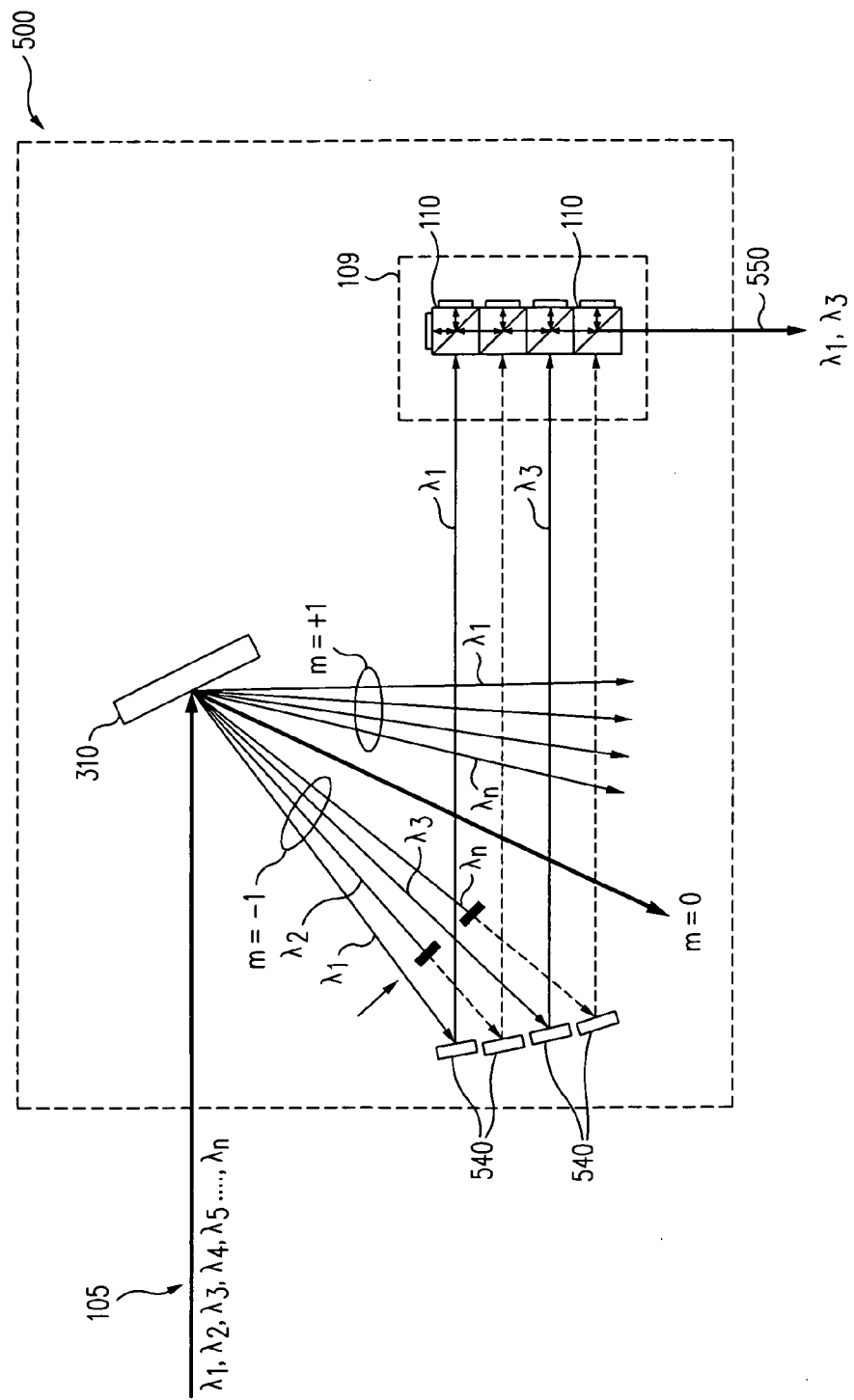
FIG. 5 is a simplified view of a light beam of wavelengths from one or more lasers and/or continuous spectra sources being dispersed by a diffraction grating, selected via blocking filters or beam stops and being directed in parallel to a bank of combining beam splitters.

FIG. 5 shows another embodiment of a beam conditioning system 500 which is similar to the previous embodiment in all respects except the following. An array of mirrors 540 are so arranged as to direct the beams at selected wavelengths into a parallel array of beams which, in turn are provided to stack 109 of combining beam splitters 110 as described in the first embodiment shown in FIG. 2. Thus, having been wavelength selected in a manner as described in beam conditioner system 400 of FIG. 4 and directed by mirrors 540 to form a parallel line of light beams, the selected beams may be combined into a single output beam 550 by the stack of beam splitters 110, such as described in beam conditioner system 200 of FIG. 2. This results in a substantially collimated single beam at the desired wavelengths, e.g., $\lambda_1$ and $\lambda_3$ in this example.

Other embodiments can be used interchangeably in the present invention to provide the desired result of selecting, combining and outputting light beams of different wavelengths for various objectives of focus, direction, convergence and the like.

Having thus described embodiments of the present invention, persons skilled in the art will recognize that changes may be made in form and detail without departing from the spirit and scope of the invention. The above description recites structures for conditioning a beam of light of multiple wavelengths by accepting the beam, whether discreet or continuous, selecting specific wavelengths by use of filters and/or diffraction gratings, and combining the selected wavelengths into an output beam. Various components of the above described embodiments can be used interchangeably. For example, the stack of beam splitters in FIG. 5 can also be used with a beam conditioning system of FIG. 3, with the focusing mirror being a mirror that outputs the selected beams in parallel. Thus the invention is limited only by the following claims.

What is claimed is:

1. An optical system for conditioning a beam of light comprised of a plurality of wavelengths and selecting from among the plurality of wavelengths for recombining into an output beam, comprising:
    a first plurality of N beam splitters comprising:
        a first beam splitter configured to receive the beam of light, provide a first output light beam, and provide a first internal light beam to a second beam splitter;
        N−2 beam splitters, each configured to receive an internal light beam from a first adjacent beam splitter, provide an output light beam, and provide an internal light beam to a second adjacent beam splitter; and
        a last beam splitter configured to receive an internal light beam from an adjacent beam splitter and provide a last output light beam;
    an array of filters, wherein each filter is configured to receive a corresponding one of the output light beams and pass through a beam having a single selected wavelength; and
    a second stack of beam splitters, each configured to receive a corresponding one of the single wavelength beams, wherein the second stack is configured to combine the single wavelength beams into a substantially single beam of light having the selected wavelengths.

2. The system of claim 1, wherein the N beam splitters of the first stack and the beam splitters of the second stack are selected from a group consisting of non-polarizing cube beam splitters, polarizing cube beam splitters, broadband dielectric surface coated polarizing beam splitters, single laser line non-polarizing front surface beam splitters, pellicle beam splitters, and neutral density beam splitters.

3. The system of claim 1, wherein the filters are selected from a group consisting of single wavelength bandpass filters, multiple wavelength bandpass filters, single wavelength notch stop-band filters, multiple wavelength notch stop-band filters, and opaque beam blocking filters.

4. The system of claim 1, wherein at least one of the beam splitters of the first or second stack comprise a mirror to conserve optical power of the associated light beam.

5. The system of claim 4, wherein all of the beam splitters of the first and second stack comprise a mirror to conserve optical power of the associated light beam.

6. The system of claim 4, wherein the mirror is selected from a group consisting of metal front surface mirrors, broadband dielectric front surface mirrors, and narrow line-width dielectric front surface mirrors.

7. An optical beam conditioning system for conditioning a beam of light comprised of a plurality of wavelengths and selecting from among the plurality of wavelengths for recombining into an output beam, comprising:
   a diffraction grating configured to receive said beam of light and disperse said beam into individual beams separated by wavelength and diffraction order;
   a plurality of filters located in front of corresponding ones of the individual beams; and
   a focusing mirror configured to receive the individual beams selected by the filters and focus and converge the selected individual beams outside the beam conditioning system.

8. The system of claim 7, wherein the diffraction grating is blazed.

9. The system of claim 7, wherein the filters are selected from a group consisting of single wavelength bandpass filters, multiple wavelength bandpass filters, single wavelength notch stop-band filters, multiple wavelength notch stop-band filters, and opaque beam blocking filters.

10. The system of claim 7, wherein the filters block selected wavelengths of light.

11. The system of claim 7, wherein the filters pass selected wavelengths of light.

12. The system of claim 7, wherein the focusing mirror is placed in front of beams of one diffraction order.

13. An optical beam conditioning system for conditioning a beam of light comprised of a plurality of wavelengths and selecting from among the plurality of wavelengths for recombining into an output beam, comprising:
   a diffraction grating configured to receive said beam of light and disperse said beam into individual beams separated by wavelength and diffraction order;
   a plurality of filters located in front of corresponding ones of the individual beams; and
   an array of planar mirrors configured to receive the individual beams selected by the filters and direct the selected individual beams outside the beam conditioning system.

14. The system of claim 13, wherein the diffraction grating is blazed.

15. The system of claim 13, wherein the filters are selected from a group consisting of single wavelength bandpass filters, multiple wavelength bandpass filters, single wavelength notch stop-band filters, multiple wavelength notch stop-band filters, and opaque beam blocking filters.

16. The system of claim 13, wherein the filters block selected wavelengths of light.

17. The system of claim 13, wherein the filters pass selected wavelengths of light.

18. The system of claim 13, wherein the array of planar mirrors is placed in front of beams of one diffraction order.

19. The system of claim 13, wherein the array of planar mirrors converges and focuses the selected individual beams.

20. The system of claim 13, wherein the array of planar mirrors directs the selected individual beams in parallel.

21. The system of claim 20, further comprising a plurality of beam splitters configured to receive the selected individual beams and combine the beams into a single beam of selected wavelengths.

22. The system of claim 21, wherein the beam splitters are selected from a group consisting of beam splitters including non-polarizing cube beam splitters, polarizing cube beam splitters, broadband dielectric surface coated polarizing beam splitters, single laser line non-polarizing front surface beam splitters, pellicle beam splitters, and neutral density beam splitters.

23. The system of claim 21, wherein the beam splitters comprise a mirror to conserve optical power of the associated light beams.

24. The system of claim 23, wherein the mirrors are selected from a group consisting of metal front surface mirrors, broadband dielectric front surface mirrors, and narrow line-width dielectric front surface mirrors.

* * * * *